US011500903B2

(12) United States Patent
Yang et al.

(10) Patent No.: US 11,500,903 B2
(45) Date of Patent: Nov. 15, 2022

(54) GENERIC MULTI-SOURCE HETEROGENEOUS LARGE-SCALE DATA SYNCHRONIZATION CLIENT-SERVER METHOD

(71) Applicant: GUANGDONG CONSTRUCTION INFORMATION CENTER, Guangdong (CN)

(72) Inventors: Haitao Yang, Guangdong (CN); Fei Xu, Guangdong (CN); Zhenjiang Ruan, Guangdong (CN)

(*) Notice: Subject to any disclaimer, the term of this patent is extended or adjusted under 35 U.S.C. 154(b) by 286 days.

(21) Appl. No.: 16/812,243

(22) Filed: Mar. 6, 2020

(65) Prior Publication Data

US 2020/0409977 A1 Dec. 31, 2020

Related U.S. Application Data

(63) Continuation-in-part of application No. PCT/CN2018/076485, filed on Feb. 12, 2018.

(30) Foreign Application Priority Data

Sep. 8, 2017 (CN) .......................... 201710805313.8

(51) Int. Cl.
*G06F 16/00* (2019.01)
*G06F 16/27* (2019.01)
(Continued)

(52) U.S. Cl.
CPC .............. *G06F 16/275* (2019.01); *G06F 8/61* (2013.01); *G06F 9/546* (2013.01); *G06F 16/2246* (2019.01)

(58) Field of Classification Search
None
See application file for complete search history.

(56) References Cited

U.S. PATENT DOCUMENTS 6,535,892 B1* 3/2003 LaRue ..................... G06F 16/27
707/999.203
7,526,575 B2* 4/2009 Rabbers ................ G06F 16/275
709/248
(Continued)

FOREIGN PATENT DOCUMENTS

CN 102542007 A 7/2012
CN 102982126 A 3/2013
(Continued)

OTHER PUBLICATIONS

International Search Report of PCT/CN2018/076485, dated Jun. 8, 2018.
(Continued)

*Primary Examiner* — Debbie M Le
(74) *Attorney, Agent, or Firm* — W&K IP

(57) ABSTRACT

The present disclosure provides a generic multi-source heterogeneous large-scale data system, including a sync node config unit, an install & deployment unit, a block & pipelining unit, a unilateral sync unit, a bilateral sync unit and a correctness guarantee unit. The system operates on a middle layer which is above a node database layer and beneath an application logic layer. In a data synchronization process, a client end transmits captured local change information to a server end in accordance with a synchronization task plan; the server end receives and transfers the change information to an asynchronous parallel message processing mechanism to be stored in a corresponding message queue; the server end polls a local message queue for reading to-be-processed change information, and then performs subsequent data change in accordance with rules for heterogeneous data mapping, so as to maintain consistence of synchronized data objects between a source end and a target end. The system of the present disclosure operates independently in a manner parallel to local applications of a synchronous node, and
(Continued)

provides a guarantee mechanism of relaxed transaction for Internet distributed multi-source heterogeneous data synchronization through collaboration of loose coupling.

16 Claims, 6 Drawing Sheets

(51) Int. Cl.
    *G06F 16/22*     (2019.01)
    *G06F 8/61*     (2018.01)
    *G06F 9/54*     (2006.01)

(56) References Cited

U.S. PATENT DOCUMENTS

| | | | |
|---|---|---|---|
| 8,024,290 B2 * | 9/2011 | Yang | G06F 16/275 707/625 |
| 8,965,954 B2 * | 2/2015 | Palay | G06Q 10/107 709/203 |
| 9,002,787 B2 * | 4/2015 | Ferrazzini | H04L 41/0213 707/625 |
| 2007/0073899 A1 | 3/2007 | Judge et al. | |
| 2007/0226263 A1 | 9/2007 | Liou | |
| 2018/0081956 A1 | 3/2018 | Xu et al. | |

FOREIGN PATENT DOCUMENTS

| | | |
|---|---|---|
| CN | 104376017 A | 2/2015 |
| CN | 104376062 A | 2/2015 |
| CN | 104778175 A | 7/2015 |
| CN | 106055723 A | 10/2016 |
| CN | 106557592 A | 4/2017 |
| CN | 106790407 A | 5/2017 |

OTHER PUBLICATIONS

Written Opinion of the ISA of PCT/CN2018/076485, dated Jun. 8, 2018.
First Office Action of Chinese Application No. 2017108053138.
Implementation of synchronization system for distributed, Lin Yuan et al.

* cited by examiner

GENERIC MULTI-SOURCE HETEROGENEOUS LARGE-SCALE DATA SYNCHRONIZATION CLIENT-SERVER METHOD

CROSS REFERENCE TO RELATED APPLICATIONS

This application is a Continuation Application of International Application No. PCT/CN2018/076485, filed on Feb. 12, 2018, which is based upon and claims priority to Chinese Patent Application No. 201710805313.8, filed on Sep. 8, 2017, the entire contents of which are incorporated herein by reference.

TECHNICAL FIELD

The present disclosure relates to the technology field of Internet distributed data processing, specifically relates to a large-scale data synchronization middle layer system for a loose calculating environment of a wide area network which is linked through Internet communication protocols, applicable to multiple mainstream data system types, and capable of covering a large number of autonomous heterogeneous data source nodes.

BACKGROUND

Heterogeneous of data refers to data with different embodiments. Heterogeneity related to data is reflected in various aspects, e.g., the differences of the computer architectures, operation systems, storage mechanisms (physical and logical), data logic models, etc., and also embodied in different RDBMS (relational database management system) products, such as Oracle, SQL Server, Sybase, MySQL, or different file types, such as TXT, CSV, XLS etc., in which the replicates of data were kept. The heterogeneous data are more than usually not just heterogeneous in one aspect, but heterogeneous in plural aspects as well. In addition, wide application of mobile terminals (such as mobile phone, PDA, iPad and laptop) leads to a large number of individual mobile terminal data, include communication records, calendars, files, which may be heterogeneous in the term of a logical or physical storage structure, and in turn occurs a tremendous demand for generic synchronization solution of heterogeneous data between the remote back-up and the mobile terminal. Moreover, mass data generated from cloud computing of large-scale applications also have a huge demand for real time data duplications involving great data volume across a number of heterogeneous data nodes.

The current heterogeneous data synchronization encountered problems of limited synchronization data throughput of mass heterogeneous data, low efficiency of large-scale heterogeneous data synchronization, being non-lightweight, or involving implementation details of concrete database products.

SUMMARY

The technical problem to be solved by the present disclosure is to overcome feasibly the defect of limited data throughput, low efficiency of large-scale heterogeneous data synchronization, and being non-lightweight, or involving implementation details of concrete database products in current generic synchronization methods for massive heterogeneous data cross Internet.

In accordance with a first aspect, an embodiment of the present disclosure provides a generic multi-source heterogeneous large-scale data synchronization system, including:
a sync node config unit, for constructing a synchronization topology of a tree structure, the synchronization topology comprising plural synchronization pairs composed of a pair of adjacent nodes, the synchronization pair comprising a client end and a server end;
an install & deployment unit, for executing installation scripts at the server end, so as to create a heterogeneous data mapping table, a change log (referred to as change log in short), a message queue, a message queue monitoring thread and a data renewal thread pool, and for executing installation scripts at the client end, so as to create a change log, a change polling thread and a sync thread pool;
a block & pipelining unit, for packing records of sync data (indicating what or how changes have made to the source data) at the source end into sync blocks, and transmitting the sync blocks sequentially to the server end in accordance with network conditions and the server end's processing capacity. An underlying pipelining of records transport within a sync block is assumed: all sync records within the same sync block will be sent in pipelining mode as a flow of TCP/IP packets—one following another without pause. The size of sync block can be adjusted for a suitable granularity. i.e., on the amount of sync records included. With this adjustment the invention can leverage for a better balance between speed and success ratio of data synchronization. And a lock-step mechanism is applied to the sync block level, hence it can resume any abort synchronization at the block where the sync process aborted, which is extremely important to achieve an ever-progress of sync transaction on block granularity;
a unilateral sync unit, for scheduling several sync threads of the client end to initiate data synchronization session when a change polling thread of the client end monitors that the change log is not blank; and for scheduling several data renewal threads of the server end to perform data renewal operation when a message queue monitoring thread of the server end monitors that the message queue is not blank;
a bilateral sync unit, for sequentially executing two unilateral syncs in opposite directions to accomplish bilateral sync; and
a correctness guarantee unit, for recording data change events of the source data end sequentially as they are inserted into the change log at the client end in an unrepeated manner, for sequentially receiving data change of the source data end at the server end, and for implementing each data change respectively in the original order and recording the data change in the change log.

Preferably, the client end comprises a middle layer software component for realizing total/incremental synchronization of data; the server end comprises a software component for receiving data change of the source data end transmitted by the client end, and renewing the received data change to a target data end; the source data end comprises a database or a file directory serving as a source of the data change during data synchronization and where data replicates are located; the target data end comprises a database or a file directory, where data replicates, in response to data change from the source data end during the data synchronization, are located.

Preferably, the intermediate node in the synchronization topology of the tree structure is provided with both a client end and a server end that respectively belong to different synchronization pairs.

Preferably, the change log of the target data end is configured to store data change information.

Preferably, the install & deployment unit includes a synchronization configuration function to control the client end to acquire metadata information of the source data end involved in the synchronization and to transmit the metadata information to the server end; control the server end to construct and store rules for heterogeneous data mapping in accordance with the metadata information; control the client end to acquire the rules for heterogeneous data mapping from the server end to construct three change capture triggers, i.e., Insert, Delete, and Update triggers (collectively referred to as "triggers") at the source data end for each data table involved in the synchronization; and control the server end to provide a visual configuration tool for maintaining or adjusting the rules for heterogeneous data mapping.

Preferably, a data renewal thread pool pre-created by the install & deployment unit at the server end comprises data renewal threads in preset numbers, and one data table's data renewal is in the charge of only one data renewal thread at the target data end; a sync thread pool pre-created by the install & deployment unit at the client end comprises data sync threads in numbers preset in accordance with the metadata information, and the incremental or total synchronization of one data table is in the charge of only one of sync threads at the source data end.

Preferably, the unilateral sync unit is also configured to control the change capture triggers to capture a data change event, and store corresponding data change information in the change log of the client end each time data change occurs at the source data end; one data change information comprises a table name of a data table undergoing data change, the primary key value of the data record and the type of the change operation.

Preferably, the unilateral sync is also configured to control the sync threads of the client end to group a number of records of change data or synced operation into sync blocks in accordance with sync presets for each data table undergoing data change, and encapsulate each of the sync blocks into a SyncML SyncML message packet and transmit these packets sequentially to the server end.

Preferably, the unilateral sync unit is also configured, in the data synchronization process, to control the server end to assign a data receiving thread to a session request from the client, so as to receive SyncML message packets uploaded by the client end; the data receiving thread is configured to receive SyncML message packets for resolving and restoring each sync block from its SyncML message packet, to store the resolved sync block in a designated message queue and feedback information for successful synchronization to the client end after successful storage.

Preferably, the unilateral sync unit is also configured to control the sync threads of the client end to associate the change log with a data table undergoing data change, to order the change log sequentially onward as insert thereof are recorded and read all data records of changes as per from the change log; and control the sync threads to delete the records in the change log corresponding to the sync block after the server end receives the sync block and returns an acknowledgment message.

Preferably, the unilateral sync unit is also configured to control the data renewal thread of the server end to read sync blocks from the message queue, and perform local data renewal in accordance with the rules for heterogeneous data mapping, so as to allow target data replicates at the target data end to be consistent with synchronous data of source data replicates at the source data end.

Preferably, the unilateral sync unit is also configured to control the sync threads of the client end to conduct Hash calculation to sync blocks to be transmitted, and encapsulate the Hash values and the sync blocks into the SyncML message packet; and control the data receiving thread of the server end to verify resolved sync blocks after receipt of the SyncML message packet, and store the sync blocks in the message queue in case of successful verification, and return a message about failed synchronization otherwise.

Preferably, the unilateral sync unit is also configured to control size of the sync block, and control the sync threads of the client end to enter a locked waiting state after transmission of each sync block, until the server end returns an acknowledge message or time is run out.

Preferably, the rules for heterogeneous data mapping of the heterogeneous data mapping table created by the install & deployment unit at the server end comprises a data table name, a primary key or a virtual primary key, a field name, a field data type, a field data length and mapping relations between the fields of the synchronized source data end and target data end.

Preferably, the install & deployment unit is also configured to construct the virtual primary key in the rules for heterogeneous data mapping; when the data table in the source data end fails to define the primary key, the install & deployment unit controls the server end to construct a virtual primary key capable of uniquely identifying its data record for the data table, and store the construction rules of the virtual primary key in the server end in accordance with field information in the metadata information.

Preferably, the install & deployment unit is also configured to check whether a message queue corresponding to the client end is present at the server end; if not, the install & deployment unit controls the server end to construct a corresponding message queue for the client end, and the message queue is configured to temporarily store the sync blocks of the corresponding client end received at the server end.

In accordance with a second aspect, an embodiment of the present disclosure provides a generic multi-source heterogeneous large-scale data synchronization method, including: acquiring heterogeneous data to be synchronized; acquiring at least one data table, i.e., table including identification information of the heterogeneous data created in accordance with the mapping rules, in accordance with the heterogeneous data; respectively creating a data sync thread in accordance with each data table; and grouping, by each data sync thread, change records into sync blocks in accordance with a preset value, respectively.

Preferably, the heterogeneous data includes incremental heterogeneous data, the acquiring heterogeneous data to be synchronized includes: creating a data change log table (referred to as change log in short) which includes field description, a field name and a field type; capturing change event information of the synced data through triggers; and recording change event information of the synced data in the change log.

Preferably, the generic multi-source heterogeneous large-scale data synchronization method further includes uploading the sync block to the server end.

Preferably, the sync block is encapsulated into a SyncML message packet.

In accordance with a third aspect, an embodiment of the present disclosure provides a generic multi-source heterogeneous large-scale data synchronization method, including: acquiring the sync block in the embodiment of the second aspect; placing the sync block in a message queue; withdrawing the sync block from the message queue and renewing the sync block into the target database.

Preferably, the acquiring of the sync block in the embodiment of the second aspect includes: receiving a SyncML message packet uploaded by the client end, the SyncML message packet containing one sync block; and resolving the SyncML message packet into a sync block.

Preferably, before the step of withdrawing the sync block from the message queue and renewing the sync block in a target database, the method includes: determining whether the sync block includes a primary key value; if not, constructing a virtual primary key in accordance with the values of plural attribute columns of the sync block.

In accordance with a fourth aspect, an embodiment of the present disclosure provides a generic multi-source heterogeneous large-scale data synchronization device, including: a heterogeneous data acquisition unit, for acquiring heterogeneous data to be synchronized; a data table acquisition unit, for acquiring at least one data table, i.e., table including identification information of the heterogeneous data created in accordance with the mapping rules, in accordance with the heterogeneous data; a thread creation unit, for respectively creating a sync thread for each data table; and a sync block unit, for the data sync thread to group records of data change from at least one data table into sync blocks in accordance with a preset value, respectively.

Preferably, the heterogeneous data includes incremental heterogeneous data, and the heterogeneous data acquisition unit includes: a change log creation sub-unit, for creating a data change log table (referred to as change log in short) which includes field description, a field name and a field type; a data change capturing sub-unit, for capturing change event information of the data through triggers; and a data change recording sub-unit, for recording change event information of the data in the change log.

Preferably, the generic multi-source heterogeneous large-scale data synchronization device further includes a data uploading unit, for uploading the sync block to the server end.

Preferably, the data uploading unit further includes an encapsulation sub-unit, for encapsulating the sync block into a SyncML message packet.

In accordance with a fifth aspect, an embodiment of the present disclosure provides a generic multi-source heterogeneous large-scale data synchronization device, including: an acquisition unit, for acquiring the above sync block; an into-message queue-placement unit, for placing the sync block into a message queue; a synchronization unit, for withdrawing the sync block from the message queue and renewing the sync block into a target database.

Preferably, the acquisition unit includes: a receiving sub-unit, for receiving a SyncML message packet uploaded by the client end, the SyncML message packet containing one sync block; a resolution sub-unit, for resolving a SyncML message packet into a sync block.

Preferably, the generic multi-source heterogeneous large-scale data synchronization device further includes: a determination unit, for determining whether the sync block includes a primary key value; a virtual primary key construction unit, for constructing a virtual primary key in accordance with the values of plural attribute columns of the sync block when the sync block does not include a primary key value.

In accordance with a sixth aspect, an embodiment of the present disclosure provides a client end, including: at least one processor; and a memory in communication connection with the at least one processor; wherein the memory stores instruction capable of being executed by the at least one processor, the instructions are executed by the at least one processor, so that the at least one processor executes the heterogeneous data synchronization method in the embodiment of the second aspect.

In accordance with a seventh aspect, an embodiment of the present disclosure provides a server end, including: a wireless network interface, a processor and a memory which are interconnected with each other via a bus, the memory stores computer instructions, the processor realizes the heterogeneous data synchronization method in the embodiment of the third aspect by executing the computer instructions.

The technical solutions of the present disclosure have the following advantages:

1. The present disclosure provides a generic multi-source heterogeneous large-scale data synchronization system, distributed on each data node involving in the synchronization, i.e., the computer system, and operated on a middle layer above a node database layer and beneath an application logic layer. In the data synchronization process, a client end transmits captured local change information to a server end under a SyncML protocol in accordance with a synchronization task plan; the server end receives the above change information and stores the information in a corresponding message queue through an asynchronous parallel message processing mechanism. The server end polls a local message queue for reading change information to be processed, and carry out subsequent data renewal in accordance with rules for heterogeneous data mapping, so as to guarantee the consistency between source data replicates and target data replicates of synchronization data. The system of the present disclosure operates in a stand-alone manner parallel to a local application at synchronization nodes, and provides a guarantee mechanism for relaxed transaction for Internet distributed multi-source heterogeneous data synchronization through loose coupling coordination.

2. The present disclosure provides a generic multi-source heterogeneous large-scale data synchronization method and device and a client end, a server end, wherein a client end acquires a metadata table for heterogeneous data to be synchronized; rules for data mapping between a source data end and a target data end are constructed in accordance with the metadata table, data sync threads are created in accordance with each data table respectively; the data sync threads group records of change from at least one data table into sync blocks respectively in accordance with a preset value. Scheduling for the synchronization operation realizes single-node-multi-thread parallel processing, and is capable of providing a dedicated sync thread for each synchronization data set; the sync thread can perform horizontal split upon a synchronous data collection in accordance with preset synchronization arrangement to form sync blocks of finer granularity, and hereby realizes a reliable synchronous transaction progressing mechanism. The above sync block is acquired at the server end; the sync block is placed into a message queue; and the sync block is withdrawn from the message queue to be renewed into the target database. At the server end, data renewal parallel processing optimization is realized through introduction of the message queue mechanism. By using unified SyncML synchronization modes, a generic data synchronization mechanism is realized in mobile networks and Internet for large relational databases, computer document objects, and document objects of mobile phone. The present disclosure provides practical heterogeneous data synchronization service on a wide area network without specific communication guarantee via a combination of a client end concurrent multiple thread scheduling, horizontal split of data sets, and asynchronous parallel processing at a server end.

BRIEF DESCRIPTION OF THE DRAWINGS

In order to make a clearer description of technical solutions in specific implementations of the present disclosure or prior art, figures involved in description for the specific implementations or the prior art will be briefly introduced, and obviously, the figures in the following description illustrate some implementations of the present disclosure, for one with ordinary skill in the art, other figures can also be obtained in accordance with these figures without delivering creative efforts.

DETAILED DESCRIPTION

Technical solutions of the present disclosure will be described clearly and completely as follows in conjunction with the figures, apparently, the described embodiments are just part rather than all embodiments of the present disclosure. Based on the embodiments in the present disclosure, all other embodiments obtained by one with ordinary skill in the art without delivering creative efforts shall fall into the protection scope of the present disclosure.

It should be noted that, in the description of the present disclosure, orientation or position relationships indicated by terms such as "center", "above", "beneath", "left", "right", "vertical", "horizontal", "inside" and "outside" are based on figure illustrations, and are merely intended to facilitate and simplify description of the present disclosure, rather than indicating or implying that the device or element concerned must be specifically oriented or constructed or operated in a specific manner, and thus shall not be construed as limitations on the present disclosure. In addition, terms such as "first", "second", "third" are intended for the purpose of description, and shall not be interpreted to indicate or imply relative importance.

In the description of the present disclosure, it should be noted that, unless specified and defined otherwise, the terms of "installation", "interconnection" and "connection" shall be understood in a broad sense, for example, a fixed connection, a removable connection, an integral connection, a mechanical connection, an electrical connection, a direct connection, an indirect connection via intermediate medium, or further, internal communication between two elements, a wireless connection, or a wired connection. Case-by-case interpretation can be made to the above terms in the present disclosure by one with ordinary skill in the art.

Furthermore, technical features involved in the described different implementations of the present disclosure can be combined with each other in the case of no contradictions.

Embodiment 1

Figure 1:
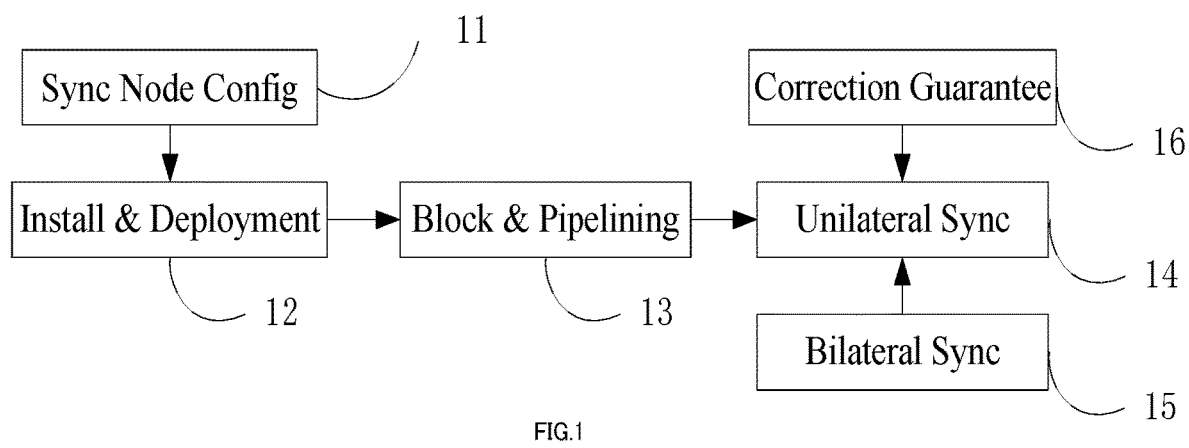
FIG. 1 is a structure diagram for generic multi-source heterogeneous large-scale data synchronization system.

The embodiment provides a generic multi-source heterogeneous large-scale data synchronization system, as shown in FIG. 1, including: a sync node config unit 11, an install & deployment unit 12, a block & pipelining unit 13, a unilateral sync unit 14, a bilateral sync unit 15 and a correctness guarantee unit 16.

The sync node config unit 11, for constructing a synchronization topology of a tree structure, the synchronization topology comprising plural synchronization pairs composed of a pair of adjacent nodes, the synchronization pair comprising a client end (relative low-level node) and a server end (relative high-level node), an intermediate node of the synchronization tree (a node other than the nodes as leaves and roots) can be provided with both a client end and a server end fulfilling different roles yet belonging to different synchronization pairs. The client end includes a middle layer software component for realizing total/incremental data synchronization; the server end includes a software component for receiving data change of the source data end transmitted by the client end and for renewing the received data change into the target data end; the client end and the server end can be installed on the same computer, each delivering their functions during synchronization operation of a synchronization pair where they are located; the source data end includes a database or a file directory serving as a source of the data change during data synchronization and where data replicates are located; and the target data end includes a database or a file directory, where data replicates, in response to data change from the source data end during the data synchronization, are located.

The system provides propagation and non-propagation configuration strategies for unidirectional data synchronization of the synchronization tree (client end→server end). The propagation strategy records the data change information into a change log of the target data end (a server end of the current synchronization pair), while the non-propagation strategy does not perform the recording operation.

The install & deployment unit 12 is configured to execute installation scripts at the server end, so as to create a heterogeneous data mapping table, and execute installation scripts at the client end, so as to create a synchronization configuration table, a change log, a change polling thread and a sync thread pool.

The rules for heterogeneous data mapping created at the server end includes a data table name, a primary key or a virtual primary key, a field name, a field data type, a field data length and mapping relations between the fields of the synced source data end and target data end. During construction of the rules for heterogeneous data mapping at server end, if the data table at the source data end fails to define the primary key, server end constructs a "virtual primary key" capable of uniquely identifying its data record for the data table, and stores the construction rules of the "virtual primary key" in the server end in accordance with field information in the metadata information. The "virtual primary key" algorithm constructs the "virtual primary key" by screening the candidate primary key fields of the data table. In addition, the server end further checks whether a message queue corresponding to the client end is present, and if not, constructs a corresponding message queue for the client end. The message queue is configured to temporarily store the sync blocks of the corresponding client end received at the server end.

The client end acquires metadata information of the source data end involved in the synchronization (structure data for all data tables involved in the synchronization at the source data end) and transmits the metadata information to the server end; the server end autonomously constructs and store rules for heterogeneous data mapping, i.e., "source data end"◄——► "target data end" in accordance with the metadata information. The client end acquires the rules for heterogeneous data mapping from the server end to construct three change capture triggers, i.e., "Insert", "Delete", And "Update" triggers at the source data end for each data table involved in the synchronization, in accordance with the rules and the change capture triggers. For the sake of checking and modifying the rules for heterogeneous data mapping, the embodiment provides a visual configuration tool at the server end for maintaining or adjusting the rules for heterogeneous data mapping.

Specifically, the client end follows a specific method in pre-creating a sync thread pool, i.e., creating several data sync threads (i.e., in a preset number) in accordance with the metadata information. The Incremental or total synchronization of one data table is in the charge of only one sync thread. The server end pre-creates a renewal thread pool following a specific method, i.e., create several data renewal threads (i.e., in a preset number). Data renewal of one data table is in the charge of only one data renewal thread.

The block & pipelining unit 13 is configured to group the data changes into sync blocks at the client end sync, and transmit the sync blocks sequentially to the server end in accordance with network conditions and processing capacity of the server end, and allow the server end to store the received sync blocks in corresponding message queues. Where, a pipeline type of non-stop transmission is adopted for the client end transmitting the change records within a sync block, and after a sync block is sent the transmission process is locked until the server end returns a receipt acknowledgment, then the transmission of the subsequent sync blocks is resumed, which is repeated until all changes are sent.

Figure 2:
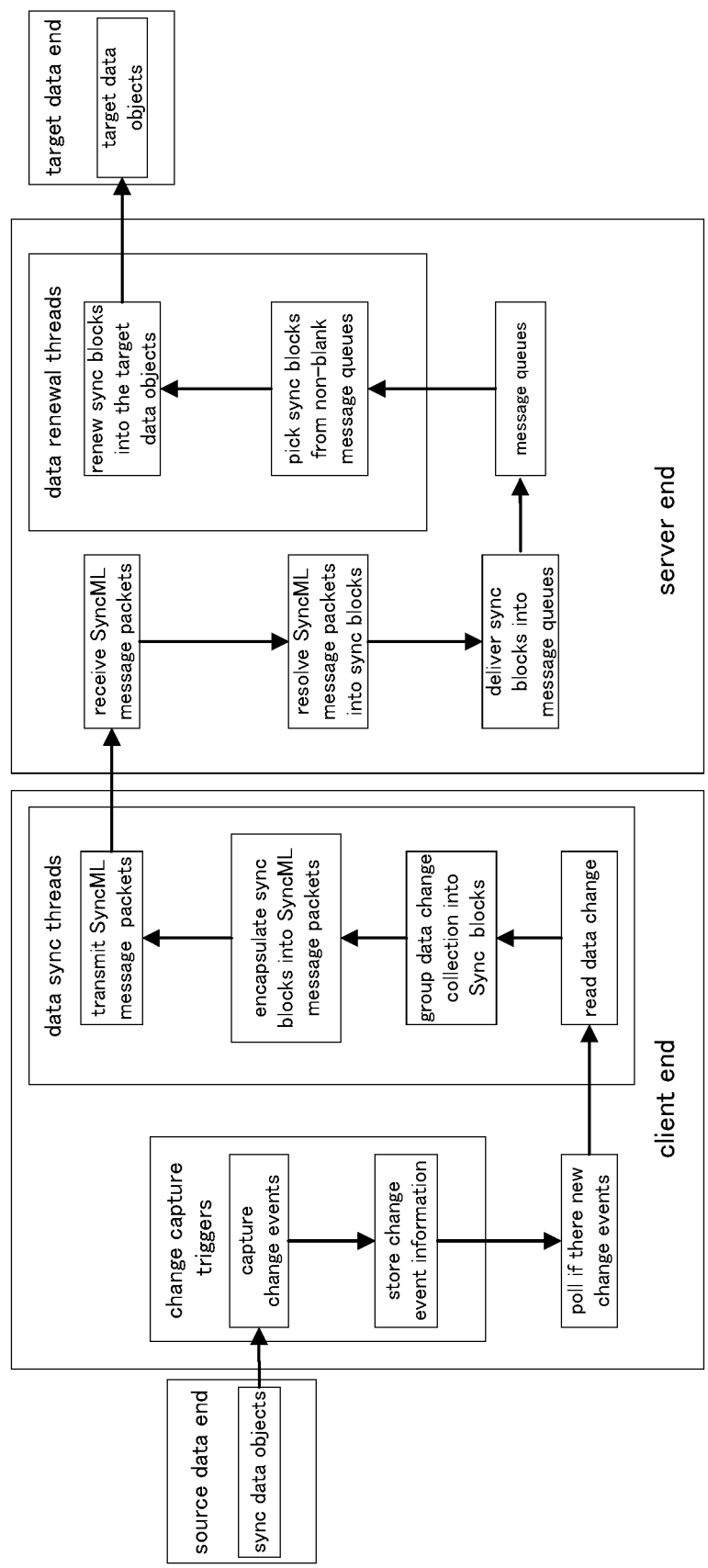
FIG. 2 is a flowchart for data synchronization processing by a generic multi-source heterogeneous large-scale data synchronization system.

The unilateral sync unit 14 is configured to schedule several sync threads of the client end to initiate data synchronization operation when a change polling thread of the client end monitors that a change log is not blank; and schedule several data renewal threads of the server end to perform data renewal operation when a message queue monitoring thread of the server end monitors that the message queue is not blank. Collaboration between the block & pipelining unit 13 and the unilateral sync unit 14 can accomplish one data synchronization, with its data processing procedures shown in FIG. 2.

Each time data change occurs at the source data end, a trigger captures the data change event, and stores data change information in a change log in the client end. The data change information includes a table name, a data-recorded primary key value, a change operation type of a corresponding data table undergoing the data change. The change polling thread of the client end discovers data change at the source data end by monitoring the change log, and the client end further initiates data synchronization operation through the sync thread. The sync thread divides all the change data or synchronization operation record into plural sync blocks in accordance with a synchronous preset of each data table, encapsulates each sync block into a SyncML message packet, and sequentially transmits the packets to the server end. In the data synchronization process, the server end assigns a data receiving thread to a session request from each SyncML message packet, and is in charge of receiving a SyncML message packet uploaded by the client end. The data receiving thread receives each SyncML message packet and from which resolves out and stores the sync block into a designated message queue through a message processing mechanism, and then feedbacks acknowledgement for successful synchronization to the client end after successful storage. The message queue monitoring thread of the server end monitor whether the message queue is blank, if not, notifies the server end to schedule several data renewal threads to perform data renewal operation. The data renewal threads of the server end perform subsequent processing in an asynchronous parallel manner, i.e., read sync blocks from the message queue, and perform local data change in accordance with the rules for heterogeneous data mapping, so as to allow the consistency between synchronization data of the target data (local data) replicates and the source data replicates.

When reading change data from a data table a sync thread of the client end firstly associates the change log with the data table, orders the change log sequentially onward as Inserts thereof are recorded and reads all data records of changes to the change log; secondly, the data sync threads transmits the SyncML message packet to the server end under an SyncML generic protocol; and finally, the data sync thread deletes the records of the change log corresponding to the sync block in the SyncML message packet, after the server end returns an acknowledgment (of receipt) message.

The heterogeneous data synchronization system in the embodiment is applicable to incremental synchronization and total synchronization. Wherein the incremental synchronization refers to synchronization of local data change newly generated since successful synchronization last time to the target data end. During implementation of the incremental synchronization, the client end polls the local change log for transmitting to-be-synchronized data change to the server end, and deletes corresponding local change log records after the server end returns a synchronization acknowledge message. Total synchronization refers to replicate all current data objects involved in the data synchronization from the source data end onto the target data end. The total synchronization in this embodiment includes two types, namely merging synchronization and refreshing synchronization. The refreshing synchronization completely erases the data table at the target data end before starting replicating the source data object to the target data object, and it is usually used for resetting a synchronization task of the synchronization pair. The merging synchronization executes an Insert operation on the target data object if the corresponding data records have not existed there, otherwise executes an Update operation. To be noted, during implementation of the total synchronization, a trigger already activated at the source data end can capture and record all local changes during the period, so as to facilitate subsequent incremental synchronization operation.

The bilateral sync unit 15 is configured to sequentially execute two unilateral syncs in opposite directions to accomplish bilateral sync, i.e., C◄——► S, equivalent to C—► S and S—► C, wherein C and S respectively represent the client end and the server end, the arrow → or ◄— represents the synchronization direction (transmission direction of the sync blocks), the same usage is applicable in the followings.

The correctness guarantee unit 16 is configured to record data change events of the source data end sequentially as they occur in the change log at the client end in an unrepeated manner, and sequentially receive data change of the source data end at the server end, and implement each data change respectively in the original order and record the data change in the change log. In this embodiment, data synchronizations, C→S or S→C, are both initiated at the client end, thus in this embodiment, the client end checks and manages the triggers of data table involved in the synchronization, for example, the client end is in charge of management of constructing, modifying and activating the triggers and consistency check. For further guaranteeing correctness in the data synchronization, incremental synchronization in this embodiment forbids single-point multi-process synchronization, i.e., forbids multiple client end processes performing data synchronization on the same source data object, so as to avoid mis-sequence in synchronization of data change of the same data object.

In addition, the system in this embodiment further provides generic "multi-attribute primary key ←→ single-attribute primary key" mapping rules, to record data change events for single and non-single attribute primary key data tables I in a change log at the client end.

Due to the fact that data synchronizations in this embodiment are initiated by the client end, in order to realize unified supervision of the data synchronization, this embodiment further provides a synchronization scheduling and a synchronization state real-time monitoring unit for each client end.

For improving reliability and security of the data synchronization, this embodiment provides two synchronization performance options, "optimistic" and "cautious". Under the "cautious" option, the sync blocks to be transmitted are required to undergo Hash calculation, and the Hash value is encapsulated into a SyncML message packet along with a sync block; after receiving the SyncML message packet, the receiver performs Hash verification to a interpreted sync block, i.e., re-calculates the Hash value of the sync block, and compares the value to a transmitted Hash value, and the verification is passed if the two are identical; in this case, the sync block stores the message queue, otherwise the receiver returns a synchronization failing message. Under the "optimistic" option, the above processing involving the Hash value is omitted. The "optimistic" option is applicable to an application scenario where there is an optimistic expectation for the reliability of the synchronization transmission and which tends to seek for higher synchronization performance, for example, conditions with a desirable network quality for synchronization communication; on the contrary, the "cautious" option is applicable to an application scenario where there is a lower expectation for the reliability of the synchronization transmission and which tends to verify the correctness of the synchronization transmission results more cautiously, for example, conditions with a not so desirable network quality for synchronization communication.

In this embodiment, the transmission is performed with a sync block as a synchronization message unit, and adopts a block-lock transmission mechanism, i.e., enters a locked waiting state after transmission of each sync block until the server end returns an acknowledge message or time is run out. The larger the sync block, the higher the transmission efficiency, and conversely the higher the cost for retransmission of the entire sync block once transmission failure occurs. This embodiment provides a function of adjusting the size of the sync block (i.e., how many of change data or change operation records are included therein), so as to debug efficiency and reliability of the large-scale data synchronization. If a network environment, including the end system environment, has high communication reliability, then the size of sync block in the synchronization is adjusted upward, otherwise when this environment has a low communication reliability the size of sync block in the synchronization should be adjusted downward. Lock-free transmission mechanism can be regarded as a special case of the lock-step transmission mechanism, equivalent to adjusting the sync block to maximum, in another word, the entire transmitted contents are deemed as one sync block.

Embodiment 2

Figure 3:
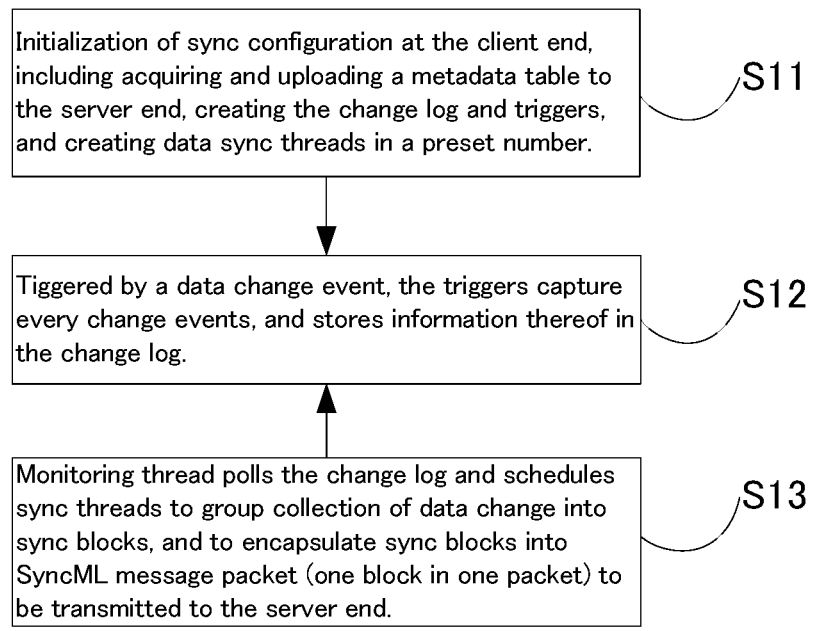
FIG. 3 is a flowchart for a heterogeneous data synchronization method.

This embodiment provides a heterogeneous data synchronization method, which is applicable to the generic multi-source heterogeneous large-scale data synchronization system in embodiment, and which will be introduced using a client end as an example, as illustrated in FIG. 3, including the following steps:

S11: initialization stage for synchronization configuration. The client end acquires metadata information of data tables involved in synchronization at a source data end, and transmits the metadata information to a server end. Then in accordance with the heterogeneous data mapping rules and change capture rule template obtained from the server, the client end constructs three change capture triggers, i.e., Insert, Delete, and Update triggers at the source data end.

S12: change event triggering stage. As soon as a change event happens the corresponding trigger shall be triggered, then the trigger stores change event information into the local change log. The change event information includes a name of the involved data table, a primary key value of the data record, the change type, as well as the change time and other information.

S13: data synchronization stage. A change polling thread polls the change log to check whether the change log is blank, and if not, notifies the client end to schedule several data sync threads to perform data synchronization operation of the involved data tables. The data sync threads groups change sets of at least one data table into sync blocks respectively in accordance with the rules for heterogeneous data mapping acquired from the server end and a preset value. Accidental abortion of mass heterogeneous data synchronization between loose coupling autonomous applications can not be neglected in a scenario of an unreliable Internet communication environment, thus it is necessary to provide a synchronization mechanism for resuming-transmission at abort point, i.e., divides the synchronization process into several sections, creating a save point at the end of each section to save the current position of synchronization progress, so as to determine the start position of a recovery synchronization process resumed after the synchronization abortion.

Prior to each round of data synchronization, the sync thread counts a total record number of the data tables to be synchronized, and informs the server end of the name of each data table and the total record number of those data tables to be synchronized, and then it starts a new round of synchronization session. When transmitting the last sync block in a round of synchronization, the sync thread informs the server end that this is the last sync block transmitted in this round of synchronization session; the server end receives the last sync block and then ends the current round of synchronization session.

Preferably, step S11 includes the following sub-steps:

S111: creating a data change log table (referred to as change log in short). The change log includes the name of a data table undergoing change, primary key value of the data record, the type of the change event, and change time and other information. Specifically, the change log is shown in 1 (applicable to the client end and the server end):

TABLE 1

| Field description | Field name | Field type |
| --- | --- | --- |
| Record identification number | CHG_SEQ_NUM | INTEGER |
| Time of Change | CHG_TIMESTAMP | TIMESTAMP |

TABLE 1-continued

| Field description | Field name | Field type |
| --- | --- | --- |
| URI of Client | SOURCE_URI | VARCHAR(256) |
| Name of Source Data table | SOURCE_TABLE | VARCHAR(128) |
| Primary key value | SOURCE_KEY_VALUE | VARCHAR(128) |
| Change type | CHG_TYPE | CHAR(1) |

S112: capturing the data change event via the triggers, wherein operation events such as Update (change), Insert (insert) and Delete (delete) of each row of data records are captured. S113: recording the data change events in the change log. The preset change log and the triggers enable the implementation of incremental synchronization of data without interfering with any upper layer application program or affecting normal database throughput.

Figure 4:
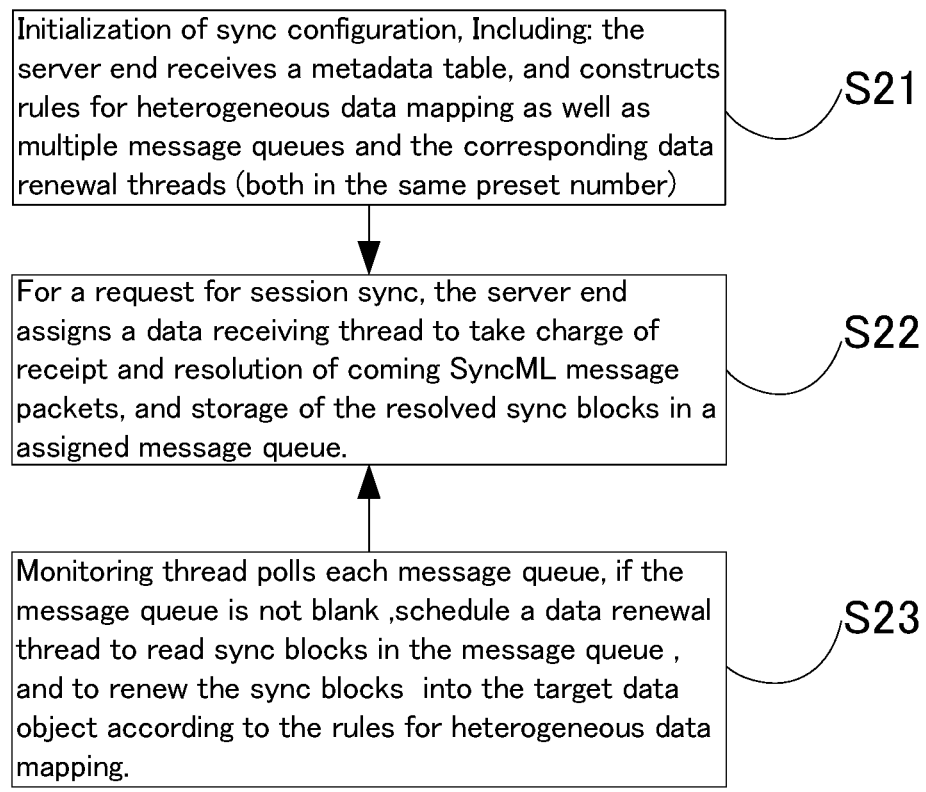
FIG. 4 is a flowchart for a heterogeneous data synchronization method.

Hereafter the server end will be taken as an example to introduce the heterogeneous data synchronization method in embodiment 2, as illustrated in FIG. 4, including the following steps:

S21: initialization stage for synchronization configuration. The server end automatically constructs and stores rules for heterogeneous data mapping between the source data end and the target data end in accordance with the metadata information uploaded by the client end; the server end constructs several data renewal threads (in a preset value).

This embodiment adopts a middle layer system written in Java languages, uses a JDBC (Java Data Base Connectivity) standard to realize a unified database access interface. Specifically, herein a method for establishing data types conversion from data types of various heterogeneous relational database to the unified Java data types (as an intermediate data type) is adopted, to establish a mapping relation for data types between heterogeneous mainstream database products such as Oracle, MySQL, MSSQL Server and Sybase, that is, the preset mapping rules. Adopting Java data type as an intermediate database type all makes sure that errors are unlikely to occur in transmission resolution between the client end and the server end.

Partial mapping between Java data type and common heterogeneous data types are illustrated as table 2.

TABLE 2

| JDBC data type | Oracle9i | Microsoft SQLServer2000 | Sybase ASE15 | Java data type |
| --- | --- | --- | --- | --- |
| BIT | NUMBER(1) | BIT | BIT | boolean |
| TINYINT | NUMBER(3) | TINYINT | TINYINT | byte |
| SMALLINT | SMALLINT, NUMBER | SMALLINT | SMALLINT, UNSIGNEDSMALLINT | short |
| INTEGER | INTEGER, NUMBER | INT | INT, UNSIGNEDINT | int |
| BIGINT | NUMBER | BIGINT | BIGINT, UNSIGNEDBIGINT | long |
| REAL | REAL, NUMBER | REAL | REAL | float |
| FLOAT | FLOAT, NUMBER | FLOAT | FLOAT | double |

During practical construction of rules for heterogeneous data mapping, mapping relations between the above various heterogeneous data type and Java data type acts as medium, for determining correspondence between specific data types of the two parties in the synchronization.

Preferably, during the processing of constructing the heterogeneous mapping rules in step S21, the process further includes: determining whether the involved data table defines a primary key, if not, constructing a virtual primary key for uniquely identifying its data records, so as to implement a synchronization guarantee process.

Specifically, the algorithm for constructing the virtual primary key is as follows: virtual primary key=str(F1)+ASII (11)+str(F2)+ . . . +ASII(11)+str(Fk), wherein F1, F2, . . . and Fk are the fields capable of jointly constituting a primary key, a str(X) function calculates a string value of a variable X, "+" is the operator of string concatenation, ASII (11) represents a character with an ASCII (American Standard Code for Information Interchange) decimal coding value of 11, which is a non-displayed character (referred to as a "vertical tab") and is unlikely to appear in the text contents.

S22: data receiving stage. For each session request from the client end for uploading SyncML message packets, the server end assigns a data receiving thread to take charge of receipt and resolution of SyncML message packets, and hands over the resolved sync block to the message processing mechanism to store in the corresponding message queue of the client. In order to improve the whole efficiency of the synchronization process, the present disclosure inserts an asynchronous parallel message processing mechanism at the server end. After receiving SyncML message packet from the client end, a data receiving thread of the server end performs simple resolution and processing only, i.e., schedules the message processing mechanism to put the resolved sync block into the queue, and returns an acknowledge message to the client end to signal that the client end can proceed with transmission of other SyncML message packets without waiting for the target data end to complete the synchronization renewal. And the sync blocks waited in the message queue will be picked up by an asynchronous processing module of the server end for parallel processing, in other words, multiple-channel parallel processing. In this way, transmission progress of the message from the client end is improved, and furthermore, that it is not necessary for the server end to complete the whole process immediately eases the overall processing pressure of the server. And in applications of large-scale data synchronization, the server end usually encounters a bottleneck of performance.

S23: data renewal stage. The message queue monitoring thread monitors whether the message queues are blank, if not blank, then the server end is notified to schedule corresponding data renewal threads to carry out data renewal onto the corresponding synchronization data objects of the queues. A data renewal thread is configured to read sync block from its message queue to renew the target data end. A data renewal thread reads the sync blocks from its message queue, and then renews the sync blocks into the corresponding synchronization data object of the target data end in accordance with the rules for heterogeneous data mapping.

Preferably, step S22 includes the following sub-steps:

S221: receiving a SyncML message packet uploaded by the client end, the SyncML message packet containing one sync block.

S222: resolving a SyncML message packet into a sync block. To find broader applications, the present disclosure performs data synchronization based on a generic SyncML standard protocol in the IT industry. SyncML, initially brought up as an open standard protocol for information synchronization independent of platforms, now belongs to the Data Synchronization and Device Management protocol family of the OMA (Open Mobile Alliance) Organization, and can perform data synchronization on compatible devices, programs or networks, enabling any device or program to obtain consistent data. However, the SyncML only provides a basic communication framework, which is far from satisfying the demand for products of practical large-scale data synchronization applications, for example, it fail to provide a reliability guarantee mechanism, which is critical in practical applications. In order to fill these gaps, the generic multi-source heterogeneous large-scale data synchronization system in embodiment 1 is provided with a correctness guarantee unit 16, for guaranteeing reliability of the heterogeneous data synchronization.

Figure 5:
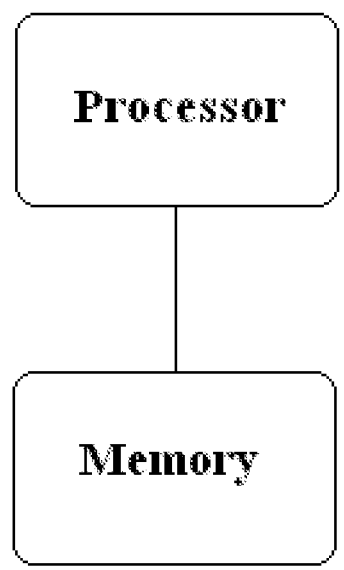
FIG. 5 is a structural diagram for a client end in an embodiment of the present disclosure.

The embodiments of the disclosure further provides a client end, as illustrated in FIG. 5, comprising, at least one processor; and a memory in communication connection with the at least one processor; wherein, the memory stores instruction capable of being executed by the at least one processor, the instructions are executed by the at least one processor to cause the at least one processor to execute the steps:

acquiring heterogeneous data to be synchronized;

acquiring at least one data table, i.e., table including identification information of the heterogeneous data created in accordance with the mapping rules, in accordance with the heterogeneous data; respectively creating a data sync thread in accordance with each data table; and grouping, by the data sync thread, change records into sync blocks in accordance with a preset value, respectively.

In the client end, wherein, the heterogeneous data comprises incremental heterogeneous data, the acquiring heterogeneous data to be synchronized includes: creating a data change log table (referred to as change log in short) which includes field description, a field name and a field type; capturing change event information of the data through triggers; and recording change event information of the data in the change log.

Figure 6:
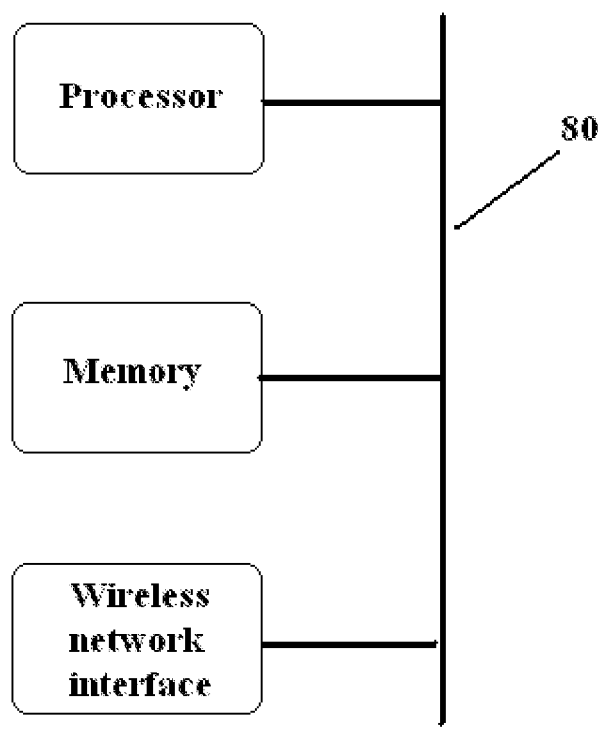
FIG. 6 is a structural diagram for a server in an embodiment of the present disclosure.

The embodiments of the disclosure further provides a server end, as illustrated in FIG. 6, comprising a wireless network interface, a processor and a memory which are interconnected with each other via a bus 80; wherein, the memory stores computer instructions to be executed to cause the processor to perform the steps:

acquiring a sync block;

placing the sync block in a message queue; withdrawing the sync block from the message queue and renewed the sync block in a target database.

In the server end, the acquiring of the sync block comprises receiving a SyncML message packet uploaded by the client end, the SyncML message packet containing one sync block; and resolving the SyncML message packet into a sync block.

Obviously, the above embodiments are merely intended to clearly illustrate rather than limit the numerated implementations. For one with ordinary skill in the art, other different forms of modifications or changes may further be made on the basis of the aforementioned descriptions. It is unnecessary and impossible to exhaust all implementations. And modifications or changes derived herefrom obviously fall into the protection scope of the present disclosure.

What is claimed is:

1. A generic multi-source heterogeneous large-scale data synchronization method, comprising:

constructing a synchronization topology of a tree structure, the synchronization topology comprising plural synchronization pairs composed of a pair of adjacent nodes, the synchronization pair comprising a client end and a server end;

executing installation scripts at the server end, so as to create a heterogeneous data mapping table, a change log, a number of message queues, a number of message queue monitoring threads and a data renewal thread pool, and for executing installation scripts at the client end, so as to create a change log, a change polling thread and a sync thread pool;

grouping change records to be sync at a source data end into sync blocks, and transmitting the sync blocks sequentially to the server end in accordance with network conditions and processing capacity of the server end, and allow the server end to store the received sync blocks in corresponding message queues; wherein, a pipeline type of non-stop transmission is adopted for the client end transmitting the change records within a sync block, and after a sync block is sent the transmission process is locked until the server end returns a receipt acknowledgment, then the transmission of the subsequent sync blocks is resumed, which is repeated until all changes are sent;

scheduling several sync threads of the client end to initiate data synchronization operation when a change polling thread of the client end monitors that the change log is not blank; and scheduling several data renewal threads of the server end to perform data renewal operation when a message queue monitoring thread of the server end monitors that there are non-blank message queues;

sequentially executing two unilateral syncs in opposite directions to accomplish bilateral sync; and recording data change events of the source data end sequentially as they occur in the change log at the client end in an unrepeated manner, for sequentially receiving data change of the source data end at the server end, and for implementing each data change respectively in the original order and recording the data change in the change log.

2. The genetic multi-source heterogeneous large-scale data synchronization method of claim 1, wherein, the client end comprises a middle layer software component for realizing synchronization of total/incremental data;

the server end comprises a software component for receiving data change of the source data end transmitted by the client end, and renewing the received data change into a target data end; the source data end comprises a database or a file directory serving as a source of the data change during data synchronization and where data replicates are located;

the target data end comprises a database or a file directory, where data replicates, in response to data change from the source data end during the data synchronization, are located.

3. The generic multi-source heterogeneous large-scale data synchronization method of claim 1, wherein, intermediate node in the synchronization topology of the tree structure is provided with both a client end and a server end that respectively belong to different synchronization pairs.

4. The generic multi-source heterogeneous large-scale data synchronization method of claim 2, wherein, the change log of the source data end is configured to store data change information.

5. The generic multi-source heterogeneous large-scale data synchronization method of claim 2, further comprising:
controlling the client end to acquire metadata information of the source data end involved in the synchronization and to transmit the metadata information to the server end, controlling the server end to construct and store rules for heterogeneous data mapping in accordance with the metadata information,
controlling the client end to acquire the rules for heterogeneous data mapping from the server end to construct three change capture triggers, which are Insert, Deletion, and Update triggers at the source data end for each data table involved in the synchronization, and
controlling the server end to provide a visual configuration tool for maintaining or adjusting the rules for heterogeneous data mapping.

6. The generic multi-source heterogeneous large-scale data synchronization method of claim 2, wherein,
a data renewal thread pool pre-created at the server end comprises data renewal threads in a preset number, and the data renewal in each data object of the target data end is in the charge of one data renewal thread;
a sync thread pool pre-created at the client end comprises data sync threads in a preset number created in accordance with the metadata information, and the incremental or total synchronization of each data object at the source data end is in the charge of only one sync thread.

7. The generic multi-source heterogeneous large-scale data synchronization method of claim 5, further comprising:
controlling the change capture triggers to capture a data change event, and storing corresponding data change information in the change log of the client end each time data change occurs at the source data end;
wherein, the data change information comprises the name of a data table undergoing data change, primary key values of the data record and the type of the change operation.

8. The generic multi-source heterogeneous large-scale data synchronization method of claim 7, further comprising:
controlling the sync threads of the client end to group records of corresponding change data or synchronization operations into sync blocks in accordance with sync presets of each data table undergoing data change, and encapsulate each of the sync blocks into a SyncML message packet and transmit the packet sequentially to the server end.

9. The generic multi-source heterogeneous large-scale data synchronization method of claim 8, further comprising:
in the data synchronization process, controlling the server end to assign a data receiving thread to a session request from the client end, so as to receive the SyncML message packets uploaded by the client end;
wherein, the data receiving thread is configured to receive SyncML message packets for resolving and restoring each sync block from its SyncML message packet, to store the resolved sync block in a designated message queue and feedback information for successful synchronization to the client end after successful storage.

10. The generic multi-source heterogeneous large-scale data synchronization method of claim 9, further comprising:
controlling the sync threads of the client end to associate the change log with a data table undergoing data change, to order the change log sequentially onward as insertion thereof are recorded and read all data records of changes from the change log; and
controlling the sync threads to delete the records in the change log corresponding to the sync block after the server end receives the sync block and returns an acknowledgment message.

11. The generic multi-source heterogeneous large-scale data synchronization method of claim 9, further comprising:
controlling the data renewal thread of the server end to read sync blocks from the message queue, and perform local data renewals in accordance with the rules for heterogeneous data mapping, so as to allow target data replicates at the target data end to be consistent with synchronous data of source data replicates at the source data end.

12. The generic multi-source heterogeneous large-scale data synchronization method of claim 9, further comprising,
controlling the sync threads of the client end to conduct Hash calculation to a sync block to be transmitted, and encapsulate the Hash values and the sync block into a SyncML message packet; and controlling the data receiving thread of the server end to verify resolved the sync block after receipt of the SyncML message packet, and store the sync block in the message queue in case of successful verification, and return a message about failed synchronization otherwise.

13. The generic multi-source heterogeneous large-scale data synchronization method of claim 9, further comprising:
controlling size of the sync block, and
controlling the sync threads of the client end to enter a locked waiting state after transmission of a sync block until the server end returns an acknowledge message or time is run out.

14. The generic multi-source heterogeneous large-scale data synchronization method of claim 1, wherein, rules for heterogeneous data mapping of the heterogeneous data mapping table created at the server end comprises a data table name, a primary key or a virtual primary key, a field name, a field data type, a field data length and mapping relations between the fields of the synchronized source data end and target data end.

15. The generic multi-source heterogeneous large-scale data synchronization method of claim 14, further comprising:
constructing the virtual primary key in the rules for heterogeneous data mapping; controlling the server end, when the data table in the source data end fails to define the primary key, to construct a virtual primary key capable of uniquely identifying its data records for the data table, and store the construction rules of the virtual primary key in the server end in accordance with field information in the metadata information.

16. The generic multi-source heterogeneous large-scale data synchronization method of claim 1, further comprising:
checking whether a message queue corresponding to the client end is present at the server end; if not, controlling the server end to construct a corresponding message queue for the client end, and the message queue is configured to temporarily store the sync blocks of the corresponding client end received at the server end.

* * * * *